United States Patent
Fujimura (10) Patent No.: US 9,166,207 B2
(45) Date of Patent: Oct. 20, 2015

(54) SECONDARY BATTERY MODULE WITH WATER COOLING JACKET

(75) Inventor: Hidekazu Fujimura, Mito (JP)

(73) Assignee: HITACHI, LTD., Tokyo (JP)

( * ) Notice: Subject to any disclaimer, the term of this patent is extended or adjusted under 35 U.S.C. 154(b) by 855 days.

(21) Appl. No.: 13/449,348

(22) Filed: Apr. 18, 2012

(65) Prior Publication Data

US 2012/0270075 A1 Oct. 25, 2012

(30) Foreign Application Priority Data

Apr. 22, 2011 (JP) .................. 2011-095633

(51) Int. Cl.
| | |
|---|---|
| *H01M 10/647* | (2014.01) |
| *H01M 2/02* | (2006.01) |
| *H01M 10/6557* | (2014.01) |
| *H01M 10/6552* | (2014.01) |
| *H01M 2/10* | (2006.01) |
| *H01M 10/64* | (2014.01) |
| *H01M 10/6563* | (2014.01) |
| *H01M 10/6568* | (2014.01) |
| *H01M 10/6551* | (2014.01) |
| *H01M 10/6555* | (2014.01) |

(52) U.S. Cl.
CPC .............. *H01M 2/0202* (2013.01); *H01M 2/02* (2013.01); *H01M 2/0237* (2013.01); *H01M 2/1016* (2013.01); *H01M 10/64* (2015.04); *H01M 10/6551* (2015.04); *H01M 10/6552* (2015.04); *H01M 10/6555* (2015.04); *H01M 10/6557* (2015.04); *H01M 10/6563* (2015.04); *H01M 10/6568* (2015.04); *H01M 2002/0205* (2013.01)

(58) Field of Classification Search
CPC ..................... H01M 10/5004; H01M 10/5046; H01M 2/1016; H01M 2/1022; H01M 10/647; H01M 10/6552; H01M 10/6557
See application file for complete search history.

(56) References Cited

U.S. PATENT DOCUMENTS

| | | | |
|---|---|---|---|
| 6,482,542 B1 | 11/2002 | Takaki et al. | |
| 6,586,132 B1 | 7/2003 | Fukuda et al. | |
| 2005/0255379 A1* | 11/2005 | Marchio et al. | 429/153 |
| 2010/0291428 A1* | 11/2010 | Graban et al. | 429/120 |

FOREIGN PATENT DOCUMENTS

| | | |
|---|---|---|
| JP | 2000-251951 | 9/2000 |
| JP | 2003-229098 | 8/2003 |
| JP | 2004-146088 | 5/2004 |
| JP | 2006-338934 | 12/2006 |
| JP | 2009-140714 | 6/2009 |
| JP | 2010-015931 | 1/2010 |
| JP | 2011-054360 | 3/2011 |
| JP | 2011054360 A * | 3/2011 |

* cited by examiner

OTHER PUBLICATIONS

JP Office Action of Appln. No. 2011-095633 dated Aug. 6, 2013 with English translation.

*Primary Examiner* — Zachary Best
(74) *Attorney, Agent, or Firm* — Baker Botts L.L.P.

(57) ABSTRACT

A secondary battery module includes a plurality of plate shaped secondary cells; and a casing that is formed with a plurality of grooves extending in its depth direction, with at least one of the secondary cells being housed in a space defined between neighboring grooves, wherein: the plurality of grooves each extends from a lower portion of the casing towards an upper portion of the casing; and the plurality of secondary cells are electrically connected together in a space defined above the grooves and internal to the casing.

5 Claims, 9 Drawing Sheets

SECONDARY BATTERY MODULE WITH WATER COOLING JACKET

INCORPORATION BY REFERENCE

The disclosure of the following priority application is incorporated herein by reference: Japanese Patent Application No. 2011-095633, filed Apr. 22, 2011.

BACKGROUND OF THE INVENTION

1. Field of the Invention

The present invention relates to the construction of a secondary battery module, of which a lithium ion battery is representative.

2. Description of Related Art

In the prior art, in many cases, with the object of increasing the load voltage or the load capacity, a module construction for an assembled battery is adopted in which a plurality of battery cells are connected in series, in parallel, or in various combinations of series and parallel, and these battery cells are housed within a casing. Moreover, from the point of view of safety, it is desirable to adopt a sealed construction in which harmful liquid, gas, smoke, flame and so on are prevented from escaping to the exterior of the battery.

There is a per se known module construction for a battery in which a plurality of battery cells are closely disposed and tightened together and are housed in a hard case. However, with only this construction, the heat that is evolved by the cells of the battery themselves is not radiated away well but builds up in the battery, so that the temperature of the battery rises to a high level, and this undesirably shortens its working life.

In recent years, there has been an increase in battery applications that employ accelerated charging and high rate discharge, so that it is easy for the battery temperature to become high, and this is yet a further cause for the working life to become shortened. In particular, if an assembled battery is constructed with flattened type battery cells so that the largest area sides of these cells are in mutual contact, then there is almost no path for heat dissipation other than the tab leads, so that the temperatures of the cells that are positioned at the central portion of the battery become extremely high, and they arrive at the ends of their working lives earlier than the cells at other positions, and as a result the overall life of the battery module becomes undesirably short. Due to this, various methods have recently been contemplated for cooling a battery module.

One background technique in this field is Japanese Laid-Open Patent Publication 2000-251951. Referring to the Abstract of this publication, we find the following description: "In a sealed group type secondary battery in which a plurality of battery cells are arranged in series, along with providing cooling medium passage portions on both sides of the battery cells along their direction of arrangement, also a cooling medium passage is formed between the cell casings and communicates between the battery cell casings with the cooling medium passage portions on both sides, so that all of the sides of the battery cells and also the portions between the battery cells are forcibly cooled with the cooling medium".

Another publication in this field is Japanese Laid-Open Patent Publication 2009-140714. Referring to the Abstract of this publication, we find the following description: "An assembled battery module is characterized in which a plurality of flattened type heat pipes are arranged in parallel between one flattened type battery cell and another flattened type battery cell, with each of these flattened type heat pipes being contacted to an externally fitted case that serves as a heat sink".

SUMMARY OF THE INVENTION

In Japanese Laid-Open Patent Publication 2000-251951 there is described a flow conduit construction for a sealed group type battery, in which uniform allocation of the flow rate of a cooling medium flowing in flow conduits provided between one cell and another is performed for all of the cells within a sealed casing. However, in order to contemplate increase of the capacity, a large number of battery cells are required, and there is a limit to how many thereof can be housed within one sealed casing, so that it is necessary to provide a battery pack system in which a plurality of these group type sealed batteries are connected in series-parallel.

Now, in order to anticipate extension of the life of such a high capacity battery pack system, if an anomaly has taken place in one of the battery cells, there is a demand for it to be possible to exchange the group type battery in which that anomalous cell is included for a new one, while still continuing operation of the system. In other words, in order to aim at long life, it is desirable for it to be possible to exchange the group type battery units, in other words the unit modules, in a simple manner even during operation of the high capacity battery system.

However, with the sealed group type battery of Japanese Laid-Open Patent Publication 2000-251951, no consideration is given to exchange of the group battery units. In other words, during exchange, it is necessary to perform electrical disconnection and reconnection and cooling medium conduit disconnection and reconnection. However, when a plurality of these group type batteries are arranged so as to be considered as being a unified battery system, no consideration is given in this publication to ease of exchange of these group type batteries, including removal of the supply conduits and the discharge conduits for the coolant. Moreover it is necessary for each battery to be housed in an external battery casing, i.e. in a so called battery container, in order for the battery and the coolant not to come into direct mutual contact with one another, so that the sealing construction becomes very complicated, and also there remains a problem from the point of view of reliability.

Furthermore, in Japanese Laid-Open Patent Publication 2009-140714, it is described to improve the temperature distribution between the flattened type cells, and internally to each one of the cells, by arranging the heat pipes between the cells in parallel. However, while there is a description in that document of an external case that is provided with a heat sink, and as to how the cooling capacity is determined by heat transmission from the external case to the exterior of the system, there is no description of any method for cooling when a plurality of these coolant flow conduits and battery systems are provided.

In other words, in connection with the method of cooling by heat dissipation to the exterior of the system without performing active cooling, a problem remains in relation to how effectively heat is radiated from the casing (i.e. from the external case) at high environmental temperature, and in particular when the amount of heat that is evolved becomes great.

Thus, the present invention provides a battery module construction with which the cooling capability in a high temperature environment is excellent, and moreover with which, in a battery pack system in which a plurality of such battery modules are provided, it is simple and easy to exchange the modules. For example, a battery module construction is supplied with which water is desirably used as the coolant and with which the cooling capacity is excellent even in a high temperature environment and with a sealed module construction, with which the temperature distribution over each battery cell and also between the battery cells is made to be uniform, and with which moreover, during exchange of modules, the task of connecting and disconnecting the coolant conduits and the task of connecting and disconnecting the electrode terminals are simple and easy.

According to the 1st aspect of the present invention, a secondary battery module comprises a plurality of plate shaped secondary cells; and a casing that is formed with a plurality of grooves extending in its depth direction, with at least one of the secondary cells being housed in a space defined between neighboring grooves, wherein: the plurality of grooves each extends from a lower portion of the casing towards an upper portion of the casing; and the plurality of secondary cells are electrically connected together in a space defined above the grooves and internal to the casing.

According to the 2nd aspect of the present invention, in the secondary battery module according to the 1st aspect, it is preferred that: the secondary battery module further comprises a water cooling jacket that has projecting portions or fins; and the projecting portions or fins of the water cooling jacket are provided so as to fit from the exterior of the casing into and along the grooves of the casing.

According to the 3rd aspect of the present invention, in the secondary battery module according to the 1st aspect, it is preferred that a circuit board for control or protection of the secondary cells is provided in a space defined by at least one of the grooves.

According to the 4th aspect of the present invention, in the secondary battery module according to the 1st aspect, it is preferred that a positive pole connector portion or a negative pole connector portion of the secondary cells is provided upon a rear surface of the casing.

According to the 5th aspect of the present invention, in the secondary battery module according to the 1st aspect, it is preferred that a surface of one of the secondary cells that has maximum area confront a surface of one of the grooves of the casing that has maximum area.

According to the 6th aspect of the present invention, in the secondary battery module according to the 2nd aspect, it is preferred that the projecting portions or fins of the water cooling jacket have hollow portions in which liquid coolant flows.

According to the 7th aspect of the present invention, in the secondary battery module according to the 2nd aspect, it is preferred that a member endowed with thermal conductivity or elasticity is interposed in a gap between the casing and the water cooling jacket.

According to the 8th aspect of the present invention, a battery pack comprises: a plurality of secondary battery modules according to the 2nd aspect; and a rack in which the plurality of secondary battery modules are arranged, wherein: each of the water cooling jackets comprises a supply aperture for coolant and a discharge aperture for coolant; and the rack comprises a branching portion that supplies coolant to the supply aperture, and a confluence portion that receives coolant discharged from the discharge aperture.

According to the 9th aspect of the present invention, in the secondary battery pack according to the 8th aspect, it is preferred that the secondary battery pack further comprises connector portions on a rear of the rack for connection between the secondary battery modules and connection cables that collect electrical current from the secondary battery modules.

DESCRIPTION OF THE PREFERRED EMBODIMENTS

In the following, several embodiments will be explained on the basis of the drawings.

Embodiment #1

In this embodiment a plurality of flat plate type or flattened type battery cells 2 are housed in a container that hereinafter will be termed a "casing". This embodiment will now be explained with reference to FIGS. 1 through 5.

Figure 1:
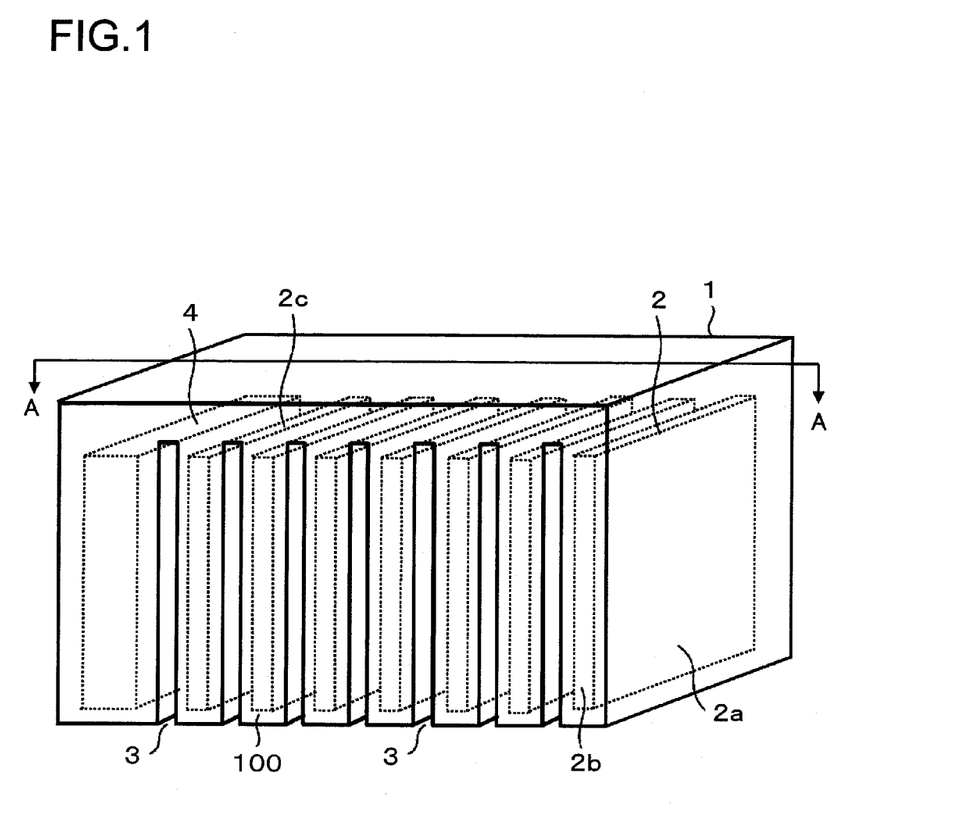
FIG. 1 is a perspective view of a first embodiment of the secondary battery module according to the present invention, and particularly shows a casing thereof.

FIG. 1 is a perspective view of the casing 1 of this embodiment. A plurality of deep casing grooves 3 are formed in the casing 1 so as to extend from the front to the end along the depth direction of the casing 1. Moreover, these casing grooves 3 extend from the lower portion of the casing 1 towards its upper portion. Battery cells 2 shown by broken lines are received in spaces 100 that are defined by these casing grooves 3 within the casing 1. The term "groove" in this embodiment can be replaced with another term such as "gap", "space", "hollow" or the like as far as it shows the groove 3 shown in FIG. 1.

Figure 2:
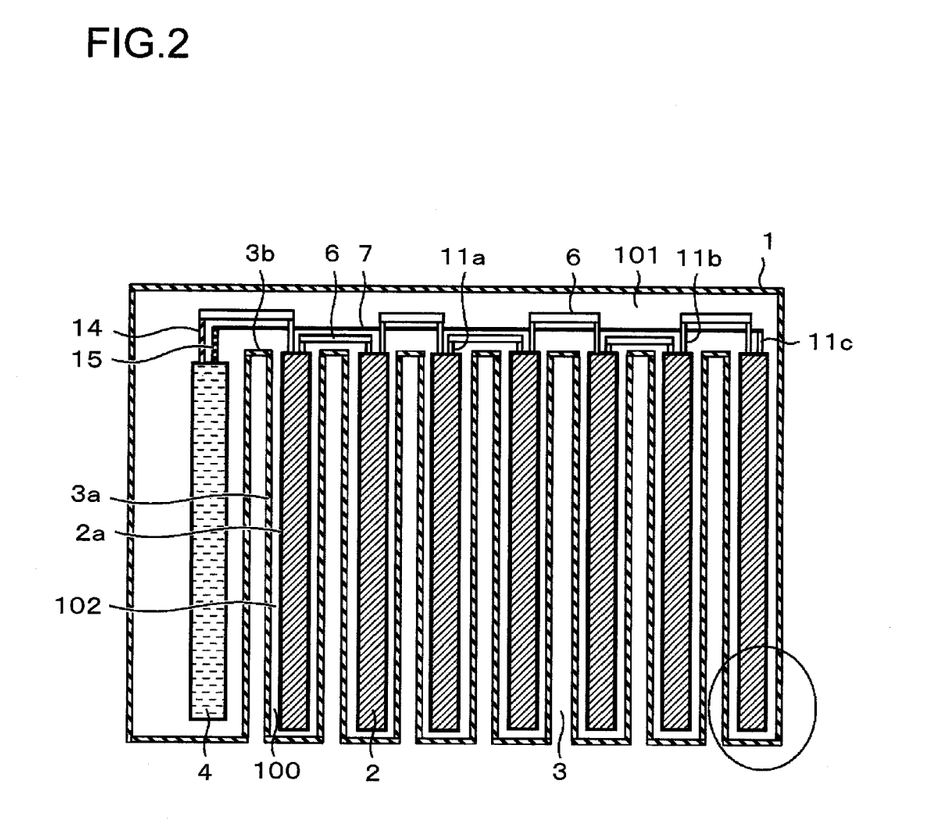
FIG. 2 is a sectional view of this first embodiment of the secondary battery module according to the present invention, taken in a plane shown by A-A in FIG. 1.

FIG. 2 is a sectional view of FIG. 1 in a plane shown by A-A in FIG. 1. The casing grooves 3 constitute flow conduits for allowing a coolant (a cooling medium), for example air, to flow from the front surface of the casing along the depth direction, and serve the function of transporting heat evolved from the sides 2a of the battery cells 2 through the casing groove inner surfaces 3a to the coolant.

Here, the direction of installation of the battery cells is such that the sides 2a of the battery cells whose areas are the largest are installed so as to face the inner surfaces 3a of the casing grooves 3. These casing groove inner surfaces 3a are the surfaces of the casing grooves 3 whose areas are the largest. Furthermore, it is desirable for the height of the casing grooves 3 to be greater than the height of the sides 2a of the battery cells 2. Due to this, it is possible to make the heat transmission areas between the battery cell sides 2a and the casing groove inner surfaces 3a maximum, and thus to enhance the cooling performance. Moreover, it is desirable for the gaps 102 that are defined between the casing groove inner surfaces 3a and the battery cell sides 2a to be as narrow as possible. In other words, this is advantageous from the point of view of cooling, since the heat conduction distances between the battery cells 2 and the casing groove inner surfaces 3a become short.

Figure 3:
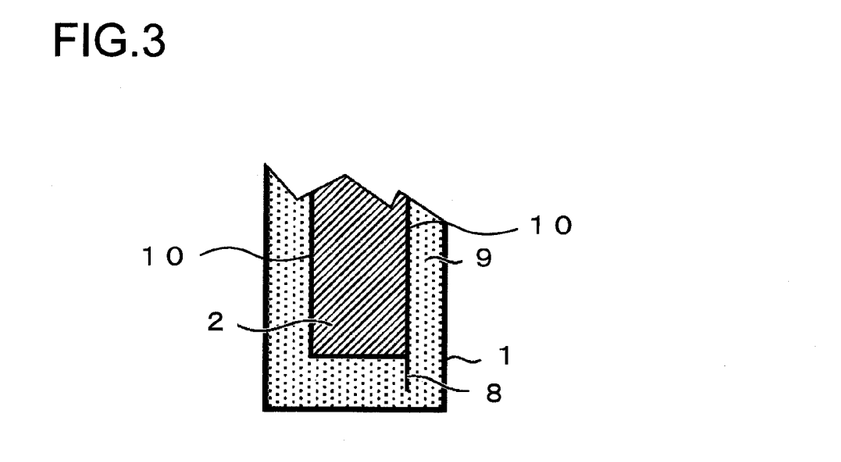
FIG. 3 is an enlarged sectional view of a portion of the interior of the casing of this first embodiment of the secondary battery module according to the present invention.

FIG. 3 is an enlarged view of one of these gaps 102. An electrically insulating and shock absorbent material 9 is packed into this gap 102. Due to this insulating and shock absorbent material 9, it is possible to fix the battery cells 2 in the spaces 100. And leakage of electrolyte or gas from within the battery cell 2 is prevented with thermocompressed seal members 8. Moreover, even if the material used for the casing 1 is a material that has good heat conductivity, such as a metal, still electrical current leaking out from the battery cells 2 is insulated, so that it is possible to prevent short circuiting. Furthermore, this shock absorbent material 9 also has a function of protecting the module against shock. Yet further, even if deformation of the battery cell 2 should take place, this shock absorbent material 9 absorbs such deformation, and thus fulfills the role of maintaining adherence. The whole of the battery cell 2 is covered by exterior films 10 that are each constituted with a laminated aluminum sheet and resin sheets sandwiching the laminated aluminum therebetween. Two sheets of the exterior film 10 are thermo-compressed over the both whole sides of the battery cell 2 to seal the battery cell 2. The thermo-compressed portion of the two exterior films corresponds to the thermocompressed seal member 8 in FIG. 3. Although the thermocompressed seal member 8 does not extend to the bottom of the case 1 in FIG. 3, it is also acceptable that the thermocompressed seal member 8 reaches the bottom of the case 1.

As considered from the point of view of heat conduction, it is demanded to reduce the vacant space in these gaps 102 as much as possible and thus to reduce the volume that is occupied by air, whose thermal conductivity is low, in order to enhance the thermal conductivity. Due to this, it is of great importance for the insulating shock absorbent material 9 to be charged perfectly into the gaps 102 so as not to leave any layer of air. Furthermore, it is desirable for the electrically insulating shock absorbent material 9 to be made from, for example, a mixture of a silicone polymer and a ceramic as a thermally conductive sheet or the like, since it is required to be a material having good heat conduction and moreover having good elasticity.

In FIGS. 1 and 2, a circuit board 4 is also shown as being housed within the interior of the casing 1, with the objectives of controlling the battery cells 2 and of providing communication and protection. Since this circuit board 4 also generates heat, it needs to be cooled. Thus, one of the spaces 100 defined by the casing grooves 3 is allocated to this circuit board 4. Due to this, it is also possible to cool the circuit board 4, in the same way as the battery cells 2. Even if a plurality of these circuit boards 4 are provided, still it is possible to provide the same number of grooves, so as to accommodate them.

In this embodiment in which the internal circuit board 4 is provided in this manner, the connecting electrical structure between the circuit board 4 and the plurality of battery cells 2 will now be explained with reference to FIGS. 2, 4, and 5. In this embodiment, an example is shown in which the battery cells 2 in the interior of the casing 1 are all connected in series.

Figure 5:
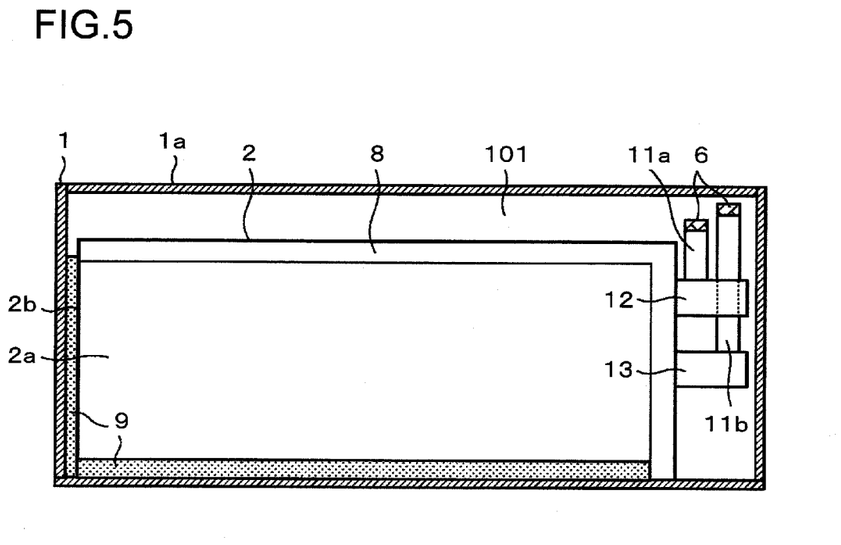
FIG. 5 is a side sectional view of the casing of this first embodiment of the secondary battery module according to the present invention.

FIG. 5 is a side sectional view of the casing 1. A battery cell 2 is housed within the space 100. The battery cell front surface 2b and the battery cell side surface 2a contact the insulating shock absorbent material 9. A negative electrode (or negative pole) tab 12 and a positive electrode (or positive pole) tab 13 both project outwards from the battery cell 2 on the rear surface thereof.

From the negative electrode tab 12 and from the positive electrode tab 13 of each of the battery cells 2 respectively, a vertical collector member 11a and a vertical collector member 11b extend upwards into an upper space 101 within the casing 1. It should be understood that this upper space 101 is a space that is defined between the casing groove inner surfaces 3b and the upper surface 1a of the casing 1, and, in this embodiment, is an space that is essential for establishing connection between the individual battery cells 2 that are received in this grooved casing construction. Thus, electrical connection is established between neighboring battery cells 2 by connection members 6, each of which is connected between the collector member 11a of one of the battery cells 2 and the collector member 11b of the neighboring battery cell 2. In other words, the collector member 11a that extends from the negative electrode tab 12 of one of the battery cells 2 is connected by one of these connection members 6 to the collector member 11b that extends from the positive electrode tab of the neighboring battery cell 2.

It should be understood that in this embodiment, as shown in FIGS. 2 and 5, in order for neighboring ones of the connection members 6 not to contact one another, the positions in the height direction and in the depth direction of the collector members 11a and 11b are changed alternatingly from one battery cell to the next. And the positive electrode current collection member 11c of the battery cell 2 that is positioned furthest from the circuit board 4 is connected by a connection wire 7 to a positive terminal 15 of the circuit board 4. Moreover, the connection member 6 that extends from the battery cell 2 that is positioned closest to the circuit board 4 is connected to a negative terminal 14 of the circuit board 4.

Figure 4:
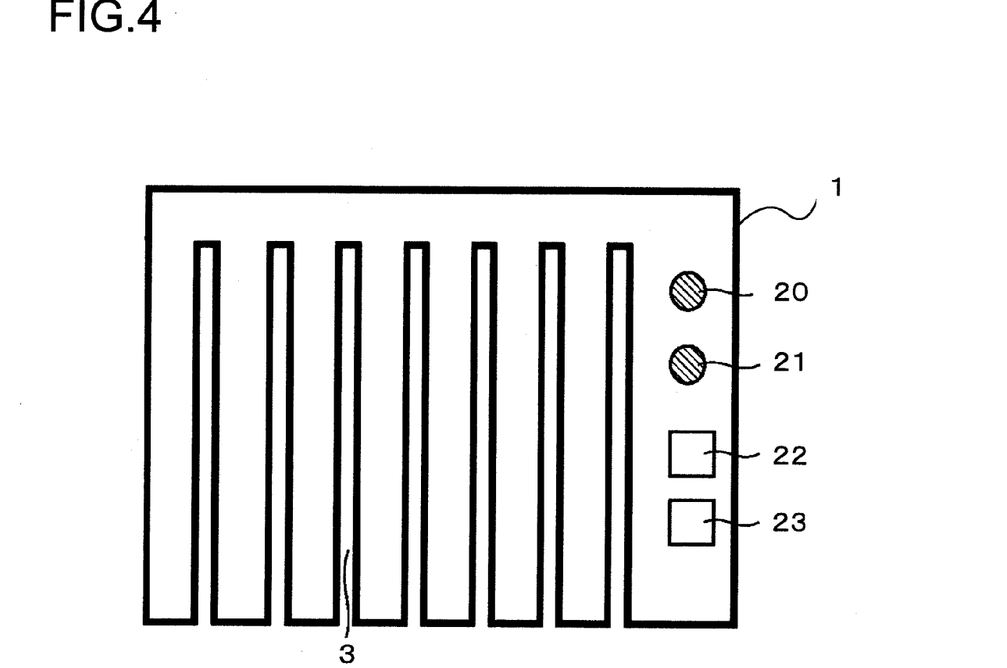
FIG. 4 is an elevation view showing the rear surface of the casing of this first embodiment of the secondary battery module according to the present invention.

FIG. 4 shows this module as seen from the rear. The casing grooves 3 pass from its front surface to the rear surface. And a positive connector terminal 20 and a negative connector terminal 21 for electrical current connection to the exterior are provided at the position where the circuit board 4 is housed. Moreover, similarly to the positive connector terminal 20 and the negative connector terminal 21, a connector for communication 22 and a disconnection switch 23 are also attached at the position on the rear surface of the casing 1 where the circuit board 4 is housed. The positive connector terminal 20 and the negative connector terminal 21 are for electrical connection to an external device. And, in this embodiment, the disconnect switch 23 has the function that, by disconnecting this disconnect switch 23, it is possible to avoid any bad influence upon the battery, even if the connector for communication 22 is physically disconnected from the external device.

If a plurality of battery modules of the type described above are employed in combination, then electrical connections between these modules are required, and these are provided by establishing connections at the rear sides of the modules. For example, if the modules are stored upon a rack, then some arrangement such as rack side connectors or the like is provided between the modules, with these rack side connectors and the module side connectors being connected together.

While, from the standpoint of economy of space, it is desired to reduce the working space for connection as much as possible, in this embodiment, the following beneficial effects are obtained by providing the connector portions upon the rear surface of the casing 1, and by performing removal of the modules from the rack and replacement thereof along the direction of the casing grooves.

It is possible to utilize portions of the casing grooves 3 for guiding the modules when taking them out from the rack or putting them back. In other words since, by attaching guides to the rack corresponding to the grooves, for example rails that fit into the grooves, it is possible to prevent deviation in directions orthogonal to the grooves, accordingly it is possible to perform positional determination between the connectors that are fixed to the rack and the connectors on the modules in an accurate manner; and moreover, since the direction of connection of the connectors and the direction of the grooves is the same, accordingly it is possible to provide a construction in which the connectors on the rear surface of the modules can be fitted or removed by a single one-touch operation. In other words, the connectors are connected while pushing the modules along the grooves towards the rack, and in the same way the connectors are separated while pulling out the modules from the rack in the direction of the grooves.

Since as described above, according to this embodiment, it is possible to cool the flat surfaces of each of the battery cells 2 that have the largest area, accordingly it is possible to make the planar temperature distribution of the temperatures of the battery cells 2 uniform. Moreover, since both the largest sides of each of the battery cells 2 are cooled, accordingly it is possible to reduce the temperature differences between the battery cells. Yet further, since it is also possible to provide a cooling surface for the circuit board 4, accordingly it is possible to house the circuit board 4 within the interior of the casing 1, and no particular new cooling construction is required for the circuit board, so that the construction becomes simplified.

Furthermore, in the case of a pack or a block system that consists of a plurality of modules, it is possible to provide a construction with which fitting and removal of these modules can be performed simply and easily, by providing the positive connector terminals 20 and the negative connector terminals 21 on the rear surfaces of the casings 1 in positions that correspond to the positions of the circuit boards 4, and by employing the casing grooves 3 for receiving guide rails. As a result, the task of exchanging modules becomes simple and easy, and moreover it is possible to anticipate that the space required for this task is reduced, so that the entire system can become more compact.

Embodiment #2

In this second embodiment, an example of a module in which the method of cooling is not air cooling but water cooling will be described with reference to FIGS. 6 and 7.

Figure 6:
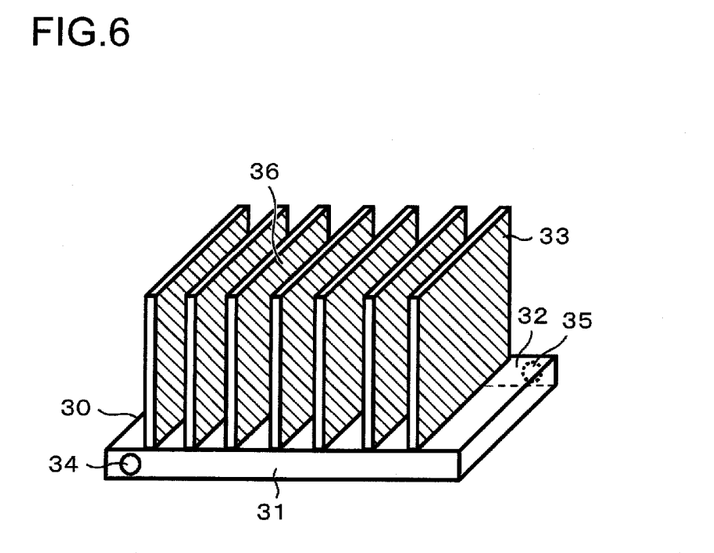
FIG. 6 is a perspective view of a water cooling jacket portion of a second embodiment of the secondary battery module according to the present invention.

FIG. 6 is a perspective view showing the structure of a water cooling jacket 30. Although the interior of the lower portion 31 of the water cooling jacket main casing is not shown in the figure, a flow conduit for water is formed therein by a partition plate or the like, and water is provided into a supply aperture (orifice) 34, and is discharged from a discharge aperture (orifice) 35 provided at a water cooling jacket main casing rear surface 32. Moreover, in this water cooling jacket 30, the same number of cooling fins 33 (i.e. projecting portions) as the number of grooves in the casing 1 extend from the water cooling jacket main casing lower portion 31 in the vertical direction. A gap 36 is defined between each cooling fin 33 and the next.

Figure 7:
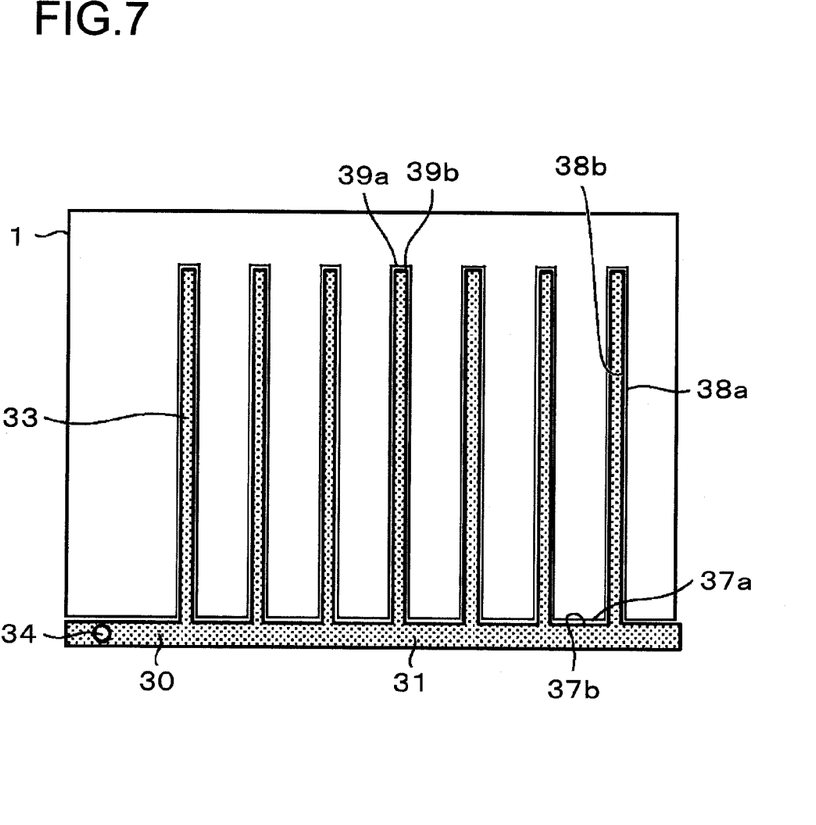
FIG. 7 is a front elevation view of this second embodiment of the secondary battery module according to the present invention.

FIG. 7 is a front elevation view of the module of this second embodiment. With the heights of the gaps 36 and cooling fins 33 appropriately adjusted, the water cooling jacket 30 described above that is formed in the shape of a toothed comb is mated as shown in FIG. 7 to a casing 1 that is formed with grooves 3 as shown in relation to the first embodiment, so that the cooling fins 33 are inserted into the grooves 3 in the casing 1. The cooling fins 33 are fitted in along the casing grooves 3 from the exterior of the casing 1. The lower surfaces 37*a* on the casing side contact the upper surfaces 37*b* on the water cooling jacket main casing side, so that these constitute heat transfer surfaces. Moreover, the sides 38*a* of the grooves in the casing contact the sides 38*b* of the cooling fins 33, so that these constitute heat transfer surfaces. However, it is acceptable for gaps to be present between the extreme end portions 39*a* of the casing grooves and the end surfaces 39*b* of the cooling fins 33. Moreover, the cooling fins 33 are perfectly received within the casing grooves 3.

The entire water cooling jacket 30 is made from a metal such as aluminum that has high thermal conductivity, and the battery cells 2 described in connection with the first embodiment are cooled by the heat that is evolved from these battery cells 2 flowing from the sides 38*a* of the grooves 3 of the casing 1 and the lower surfaces 37*a* on the casing side to the sides 38*b* of the cooling fins and the upper surfaces 37*b* on the water cooling jacket main casing side, then being transmitted to the water that flows in the water cooling jacket main casing lower portion 31.

Since this embodiment is cooled by water as compared to the first embodiment that is cooled by air, accordingly the cooling performance is enhanced to a higher level. In particular, in the case of air cooling, since when the environmental temperature becomes high the temperature of the air that is the coolant also becomes high, accordingly the situation with regard to cooling becomes problematic; but, in the case of water cooling, there is the advantageous aspect that little influence is experienced from the environmental temperature, since the thermal capacity of water is large.

Moreover, since it is possible to separate the casing 1 and the water cooling jacket 30 in a simple manner, accordingly, even if an anomaly develops with one of the cells internal to the casing 1, and the module needs to be exchanged for this reason, it is possible to exchange the module extremely simply and easily, since the water cooling system including the water cooling jacket 30 can be left mounted just as it is, and it is only necessary to remove the casing 1 from the front along the casing grooves 3. Furthermore, since the cooling fins 33 and the casing grooves 3 serve the function of guides, even if no special guides are provided, it still is possible to perform one-touch removal and replacement of the connectors, in a similar manner to the case with the first embodiment.

Embodiment #3

In this embodiment, a water cooling jacket construction will be explained with reference to FIGS. 8 through 11 in which water can flow, not only through the main casing portion of the water cooling jacket 30, but also in the interiors of the cooling fins 33 described above.

Figure 8:
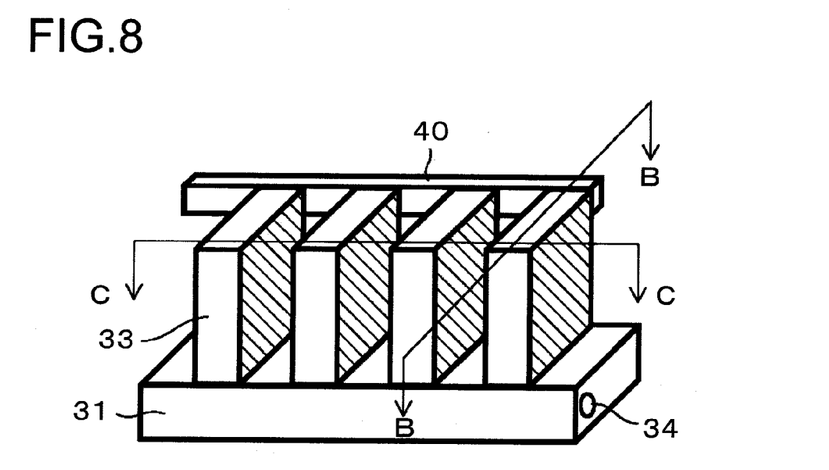
FIG. 8 is an overall perspective view of a water cooling jacket portion of a third embodiment of the secondary battery module according to the present invention.

FIG. 8 is an overall perspective view showing the water cooling jacket of this third embodiment. Cooling fins 33 extend in the vertical direction from a lower portion 31 of the water cooling jacket. Moreover, the number of the cooling fins 33 is the same as the number of the casing grooves 3. A water supply aperture 34 is provided in the water cooling jacket main casing lower portion 31, and a discharge header 40 is provided at the upper portions of the cooling fins 33, i.e. at the rear side of the water cooling jacket 30.

Figure 9:
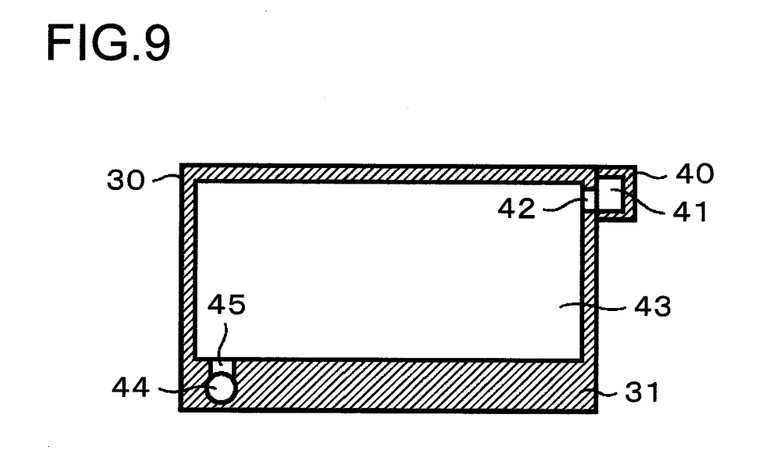
FIG. 9 is a side sectional view of this water cooling jacket portion of the third embodiment of the secondary battery module according to the present invention, taken in a plane shown by B-B in FIG. 8.
Figure 10:
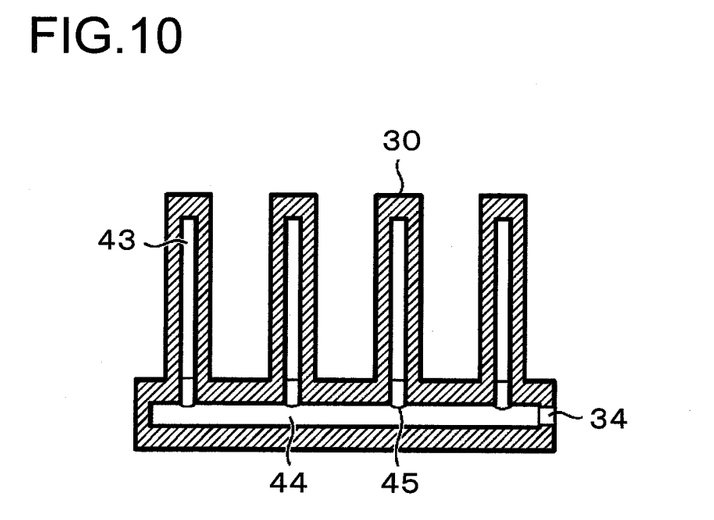
FIG. 10 is a front sectional view of this water cooling jacket portion of the third embodiment of the secondary battery module according to the present invention, taken in a plane shown by C-C in FIG. 8.

FIG. 9 is a side sectional view of this water cooling jacket 30 taken in a plane shown by B-B in FIG. 8, and FIG. 10 is a front sectional view thereof taken in a plane shown by C-C in FIG. 8. Cooling water that enters through the water supply aperture 34 flows into a water supply header 44 that is provided in the interior of the water cooling jacket main casing lower portion, and flows into hollow portions 43 of the cooling fins 33 via branching apertures 45. And then it flows from discharge apertures 42 that serve as outlets via a flow conduit 41 of the discharge header 40 to be discharged to the exterior of the module.

It should be understood that the reason that the discharge header 40 is provided at the upper portions of the cooling fins 33 is in order to ensure that cooling water is reliably flowed to the entire area of the hollow portions of the cooling fins 33, even if the discharge pressure of the pump should drop, or the amount of the cooling water should drop, or the water pressure should drop. If it may be assumed that a situation such as described above will not eventuate, then it would be acceptable to provide the discharge header 40 and the discharge aperture 42 in the jacket main casing lower portion 31, similarly to the supply side.

Figure 11:
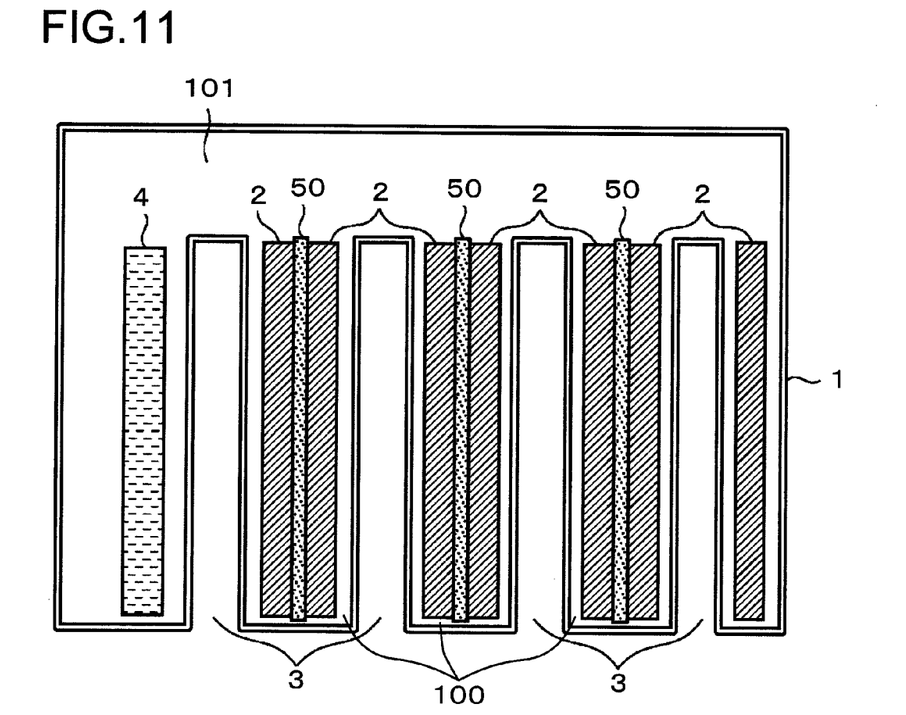
FIG. 11 is a vertical sectional view of the front of the casing of this water cooling jacket portion of the third embodiment of the secondary battery module according to the present invention.

The cooling water jacket 30 of this embodiment is built so that cooling water flows in the interiors of the cooling fins 33. However, in order to ensure space for flow conduits of the type described above, it is necessary for the cooling fins 33 to be rather thick. Due to this, the pitch of the casing grooves 3 becomes large, and thus it is necessary to reduce the number of grooves in order to keep the width of the casing constant, FIG. 11 is a vertical sectional view of the front of the casing 1 of this third embodiment. It should be understood that an electrical connection section that is provided in the space 100 at the upper portion of the casing 1 is omitted, since it has similar structure and function to the corresponding section in the first embodiment. With the casing 1 of this embodiment, while reducing the number of casing grooves 3, the width of the grooves and the pitch of the grooves are increased instead. At the same time, the width of the spaces 100 that are defined by these casing grooves 3 within the casing 1 is increased and the number of the spaces 100 is discreased.

And two of the battery cells 2 are inserted as a group into each of the spaces 100 the width of which is increased. Furthermore, a heat diffusion plate 50 is provided between these two battery cells 2. An aluminum plate that has high thermal conductivity may be used for this heat diffusion plate. By this heat diffusion plate 50 being inserted, it is possible to make the distribution of temperature in the plane of the battery cells that contact the heat diffusion plate 50 more uniform.

As compared to the second embodiment described above, since the number of battery cells 2 that are fitted into each of the spaces is now two, accordingly the distribution of temperature in the direction in which the battery cells 2 are layered together (i.e. in the thickness direction) becomes somewhat wider. However, since the cooling water flows to all parts of the fins, accordingly the cooling performance is remarkably enhanced. Since as a result it is possible to reduce the cooling water flow rate, accordingly it is possible also to reduce the power required for the pump and also the size of the radiator for cooling the circulating cooling water that is discharged from the module.

Embodiment #4

This embodiment is an example in which the adherence between the cooling fins 33 and the casing grooves 3 that they are in contact with is enhanced; it will now be explained with reference to FIGS. 12 and 13.

Figure 12:
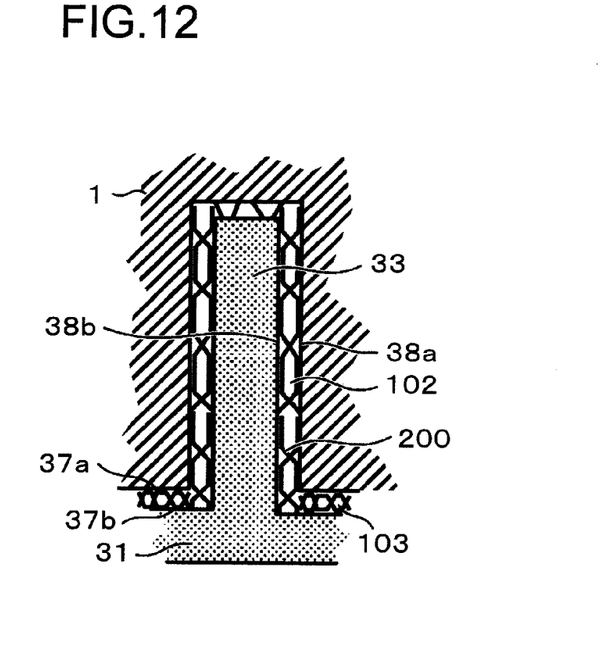
FIG. 12 is an enlarged vertical sectional view showing part of a contact portion between a water cooling jacket and a casing of a fourth embodiment of the secondary battery module according to the present invention.

FIG. 12 is an enlarged vertical sectional view showing part of the contact portion between the water cooling jacket 30 and the casing 1 of this fourth embodiment. A lubricating material or grease is applied between the grooves 3 and the cooling fins 33 of the water cooling jacket 30, in order to reduce frictional resistance when inserting or taking out the cooling fins 33 along the grooves 3 of the casing 1. Moreover, this grease not only plays the role of lubrication, but also should have the physical property of high thermal conductivity, i.e. should be a high thermal conductivity grease.

However, in order to ensure the reliability of the thermal conductivity over a long time period, the following structure is additionally provided. That is, metallic spring members 200 are provided in the gaps 102 between the sides 38a of the grooves 3 in the casing 1 and the sides 38b of the cooling fins 33, so as to extend in the depth direction along the grooves 3. Moreover, if the contacting between the lower surface 37a on the casing and the upper surface 37b on the water cooling jacket main casing is not good, then it would also be acceptable intentionally to leave a gap 103 between them, and also to insert further spring members 200 in these gaps.

While, in this embodiment, these spring members 200 are fixed in advance to the water cooling jacket 30, it would also be acceptable to arrange to insert the spring members 200 after having installed the casing 1 to the water cooling jacket 30. In this case, when the state with the water cooling jacket 30 fitted to the casing 1 has been established, the spring members 200 fulfill the role of conducting heat between the side surfaces 38a of the grooves 33 of the casing 1 and the sides 38b of the cooling fins 33. Accordingly, it is desirable for the thermal conductivity of the spring members 200 to be high.

Furthermore, with regard to the structure for the spring members 200, it is desirable for the area of their planar portions such as plate springs to be large, so that the contact areas between the lower surface 37a on the casing 1 and the upper surface 37b on the main casing of the water cooling jacket 30, and the sides 38a of the grooves 3 of the casing 1 and the sides 38b of the cooling fins 33, are as large as possible. Moreover, with regard to the functioning of the spring members 200, it is desirable for the springs to maintain their elasticity of the springs, so as always continuously to exert high surface pressure upon both the water cooling jacket 30 and the casing 1, even if some change should occur in the widths of the gaps 102 and 103 due to difference between the coefficients of thermal expansion of the casing 1 and the water cooling jacket 30.

Figure 13:
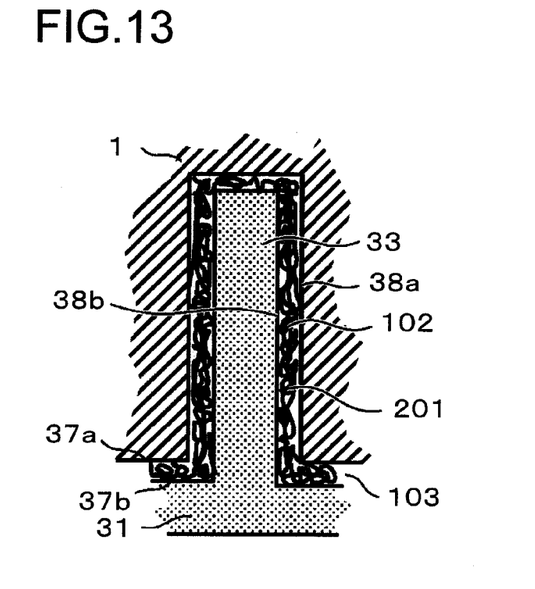
FIG. 13 is another enlarged vertical sectional view of part of the contact surface between the water cooling jacket portion and the casing of this fourth embodiment of the secondary battery module according to the present invention.

FIG. 13 is a variant of this embodiment. The feature by which this variant embodiment differs from the fourth embodiment shown in FIG. 12 is that, rather than the spring members 200 being inserted into the gaps 102 and 103, metallic fiber 201 that has high thermal conductivity is charged therein. Moreover, of course, there would be no problem if both the spring members 200 of FIG. 12 and the metallic fiber of FIG. 13 were to be inserted into these gaps, and doing so would further increase the heat transfer contact are, and would further enhance the thermal conductivity.

It should be understood that the material to be charged into the gaps 102 and 103 is not limited to being metallic fiber; it would also be acceptable for it to be metallic foil or metallic mesh or the like, provided that it is a substance that can be inserted into these narrow gaps, that can track changes in the widths of the gaps 102 and 103 due to difference in the coefficients of thermal expansion of the casing 1 and the water cooling jacket 30, and that can maintain good contacting with the surfaces of the casing 1 and of the water cooling jacket 30.

Embodiment #5

This embodiment is an example of a high capacity secondary battery pack according to the present invention that is built up by fitting a plurality of modules according to any one of Embodiments 2 through 4 described above and each including a casing 1 and a water cooling jacket 30 into a rack 70; and it will now be explained with reference to FIGS. 14 and 15.

Figure 14:
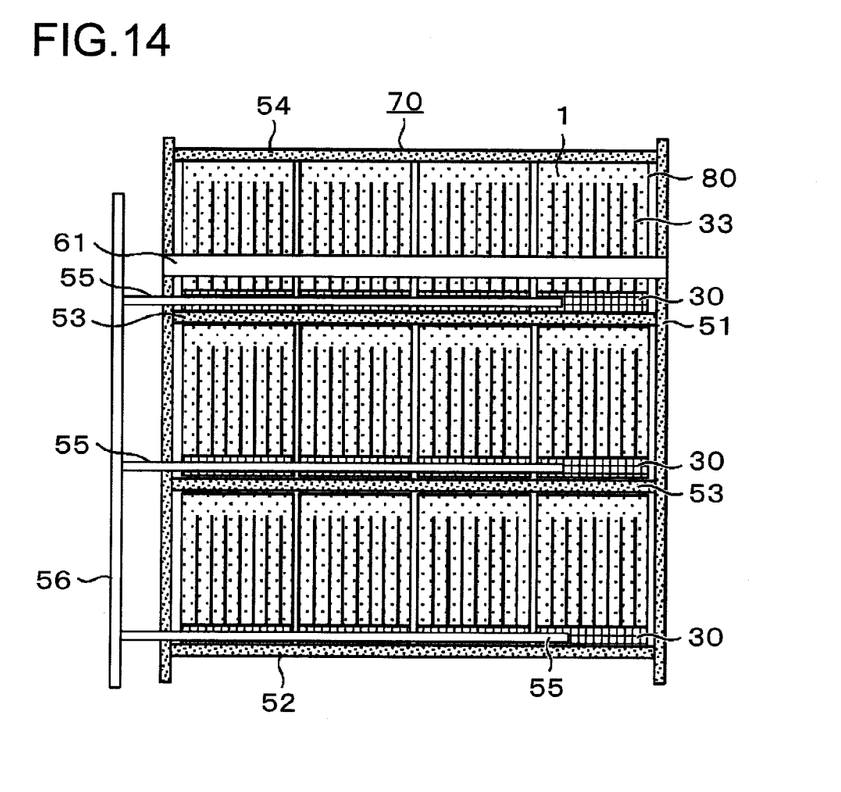
FIG. 14 is an elevation view of a secondary battery pack construction that is made from a plurality of secondary battery modules, according to a fifth embodiment of the present invention.
Figure 15:
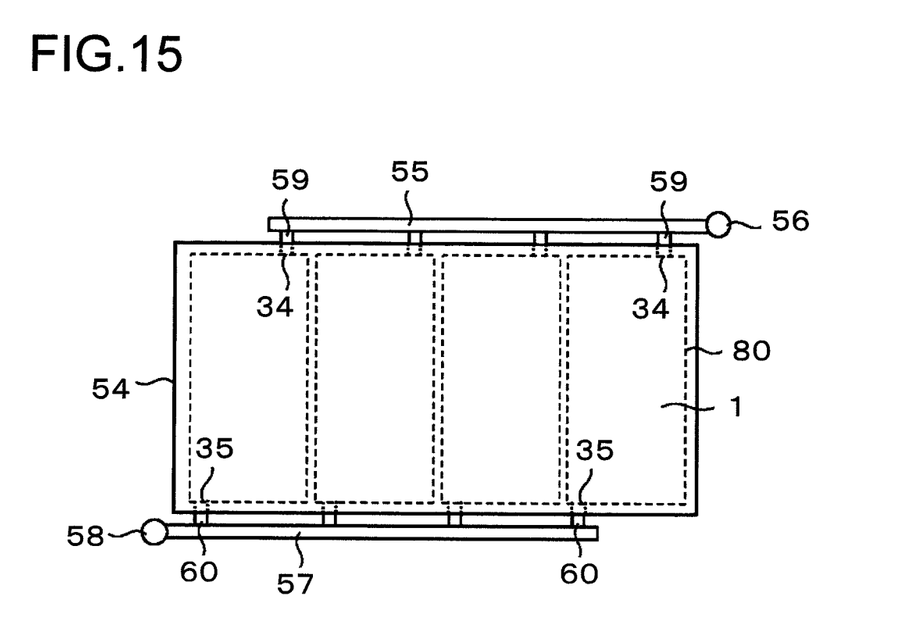
FIG. 15 is a plan view of this secondary battery pack construction made from a plurality of secondary battery modules, according to this fifth embodiment of the present invention.

FIG. 14 is an elevation view showing this battery pack construction, in which twelve modules 80 are arranged in the rack 70 in three levels each of which contains four modules, and FIG. 15 is a plan view thereof as seen from above.

Four of the modules 80 are arranged along the horizontal direction in each level of the rack 70, each including a water cooling jacket 30 and a casing 1. The water cooling jackets 30 are fixed to a lower plate 52 of the rack 70, and to intermediate plates 53 thereof. The casings 1 are also fixed by the cooling fins 33 that protrude upwards from the water cooling jackets 30 being inserted into grooves provided in the casings 1. It should be understood that, in some cases, a protective fence 61 may also be provided between side plates 51 of the rack, in order to stop the casings 1 from falling out from the front of the rack 70.

Supply apertures 34 and discharge apertures 35 are provided to the water cooling jackets 30 on each level. On each level, a water supply header 55 extends along the front of the rack 70 in the direction in which the modules 80 are arranged, and the same number of inlet branching conduits 59 are provided branching off from this water supply header 55 as the number of modules 80 (i.e., four), with these inlet branching conduits 59 being connected to the supply apertures 34.

In a similar manner, on each level, a discharge header 57 (not shown in FIG. 14) extends along the rear of the rack 70 in the direction in which the modules 80 are arranged, and the same number of discharge confluence conduits 60 are provided joining into this discharge header 57 as the number of modules 80 (i.e., four), with these discharge confluence conduits 60 being connected to the discharge apertures 35. Moreover, a water supply conduit 56 and a water discharge conduit 58 are connected, on each level, to the supply header 55 and the discharge header 57 for that level respectively.

The cooling water that has been supplied into the water supply conduit 56 is thus distributed between the water supply headers 55 on each level, and, on each level, is distributed between the inlet branching conduits 59, thus being supplied to the water cooling jackets of the modules 80 on that level. And, the heat that is generated interior to the casing 1 of each of the modules is transferred by the cooling fins 33 provided on the water cooling jacket 30 to the cooling water, so that this heat is taken away. Then the cooling water passes out through the discharge confluence conduits 60 and is collected into the discharge headers 57, and from the discharge headers 57 is collected to the water discharge conduit 58.

Although this feature is not shown in the figures, it should be understood that connection cables or bus bars for collecting the electrical current from the modules 80, and connector portions for connecting these members to the modules 80, are provided at the rear of the rack 70.

During the operation of this system it is very desirable, if during operation an anomaly is observed with one of the twelve modules 80 in the rack 70, to maintain the operation of the remaining eleven modules 80, while only exchanging the anomalous module 80.

Moreover, as shown for the first embodiment described above, disconnect switches 23 are provided upon the rear surfaces of the casings 1 of the modules 80 of this embodiment. Thus, if an anomaly has been observed with one of the modules 80, then the disconnect switch 23 of this anomalous module 80 may be cut off, so that it is electrically disconnected from the other modules. However, the cooling water continues to flow in the water cooling jacket 30 of the anomalous module 80.

Next, the casing 1 of the anomalous module 80 is pulled out from the front surface of the rack 70 along the direction of the grooves in the casing 1 of this module 80. At this time, as shown for the first embodiment, the construction is such that the connector portion on the rear surface of the module 80 is automatically separated from a connector portion on the rack as the casing 1 is pulled out. Accordingly, other than operation of the disconnect switch, no further task of electrical disconnection is required. Moreover, since the casing 1 can be separated from the water cooling jacket 30, accordingly no work is required for separating the cooling water conduits.

In this manner, according to this embodiment, even in the case of a battery pack in which a plurality of battery modules are combined, it is possible to exchange one of the modules in a convenient manner while still maintaining operation. Moreover, with regard to the volume of this battery pack, since it is not necessary to provide any space for heat dissipation fins protruding from the casings 1 of the modules 80 or for flow conduits and so on for the coolant between one module and the next, accordingly no large spaces need to be provided between the modules, so that it is possible to arrange the modules at high density. As a result, it is possible to make the battery pack compact.

It should be understood that a high capacity secondary battery pack can be built up by fitting a plurality of modules according to Embodiment 1 into a rack similar to the rack 70.

According to the embodiments described above, on any desired surface of the casing of the module that incorporates the plurality of flat plate shaped secondary cells, it is arranged to provide the plurality of grooves extending in parallel along the depth direction of the casing while leaving a space above them in the interior of the casing, and to dispose the flat plate shaped cells in the interior of the casing between each of the grooves and the next.

Moreover, it is arranged to provide the water cooling jacket having the projecting portions or fins exterior to the casing, so as to contact against the surface thereof upon which the grooves are provided.

According to the embodiments described above, it is possible to provide a secondary battery module that provides excellent cooling capacity in a high temperature environment, and moreover with which exchange of modules in a battery pack system in which a plurality of the battery modules are disposed is simple and easy.

It should be understood that the present invention is not to be considered as being limited to the embodiments described above; variant embodiments of numerous types are also included. For example while various non-essential details have been explained in the embodiments described above, in order to simplify the explanation of the present invention and to render it easy, not all of the structure that has been explained need necessarily be included, and it is not to be considered as being limitative. Moreover, portions of the structure of some embodiments may also be replaced by portions of the structure of other embodiments. Furthermore, it would also be possible to add portions of the structure of some embodiments to portions of the structure of other embodiments.

What is claimed is:

1. A secondary battery module, comprising: a plurality of plate shaped secondary cells;
    a casing that is formed with a plurality of grooves extending in its depth direction, with at least one of the secondary cells being housed in a space defined between neighboring grooves;
    a water cooling jacket that has projecting portions or fins, wherein the projecting portions or fins of the water cooling jacket are provided so as to fit from the exterior of the casing into and along the grooves of the casing and the projecting portions or fins of the water cooling jacket have hollow portions in which liquid coolant flows, wherein:
    the plurality of grooves each extends from a lower portion of the casing towards an upper portion of the casing; and
    the plurality of secondary cells are electrically connected together in a space defined above the grooves and internal to the casing; and
    a circuit board for control or protection of the secondary cells provided in a space defined by at least one of the grooves;
    wherein the casing comprises a positive connector terminal, a negative connector terminal, a communication connector, and a disconnection switch disposed on a rear surface of the casing where the circuit board is housed, whereby the secondary battery module is adapted for electrical connection to one or more other battery modules at the rear sides thereof.

2. A secondary battery module according to claim 1, wherein: a largest planar surface of one of the secondary cells confronts a largest planar surface of one of the grooves of the casing.

3. A secondary battery module according to claim 1, wherein:
    a member endowed with thermal conductivity or elasticity is interposed in a gap between the casing and the water cooling jacket.

4. A battery pack, comprising:
    a plurality of secondary battery modules according to claim 1; and a rack in which the plurality of secondary battery modules are arranged, wherein:
    each of the water cooling jackets comprises a supply aperture for
    coolant and a discharge aperture for coolant; and
    the rack comprises a branching portion that supplies coolant to the supply aperture, and a confluence portion that receives coolant discharged from the discharge aperture.

5. A secondary battery pack according to claim 4, further comprising:
    connector portions on a rear of the rack for connection between the positive connector terminals and negative connector terminals of the secondary battery modules and connection cables that collect electrical current from the secondary battery modules.

* * * * *